April 3, 1928. 1,664,999
W. J. TRETCH ET AL
RECORDING APPARATUS FOR TESTING MACHINES
Filed Dec. 15, 1922 4 Sheets-Sheet 1
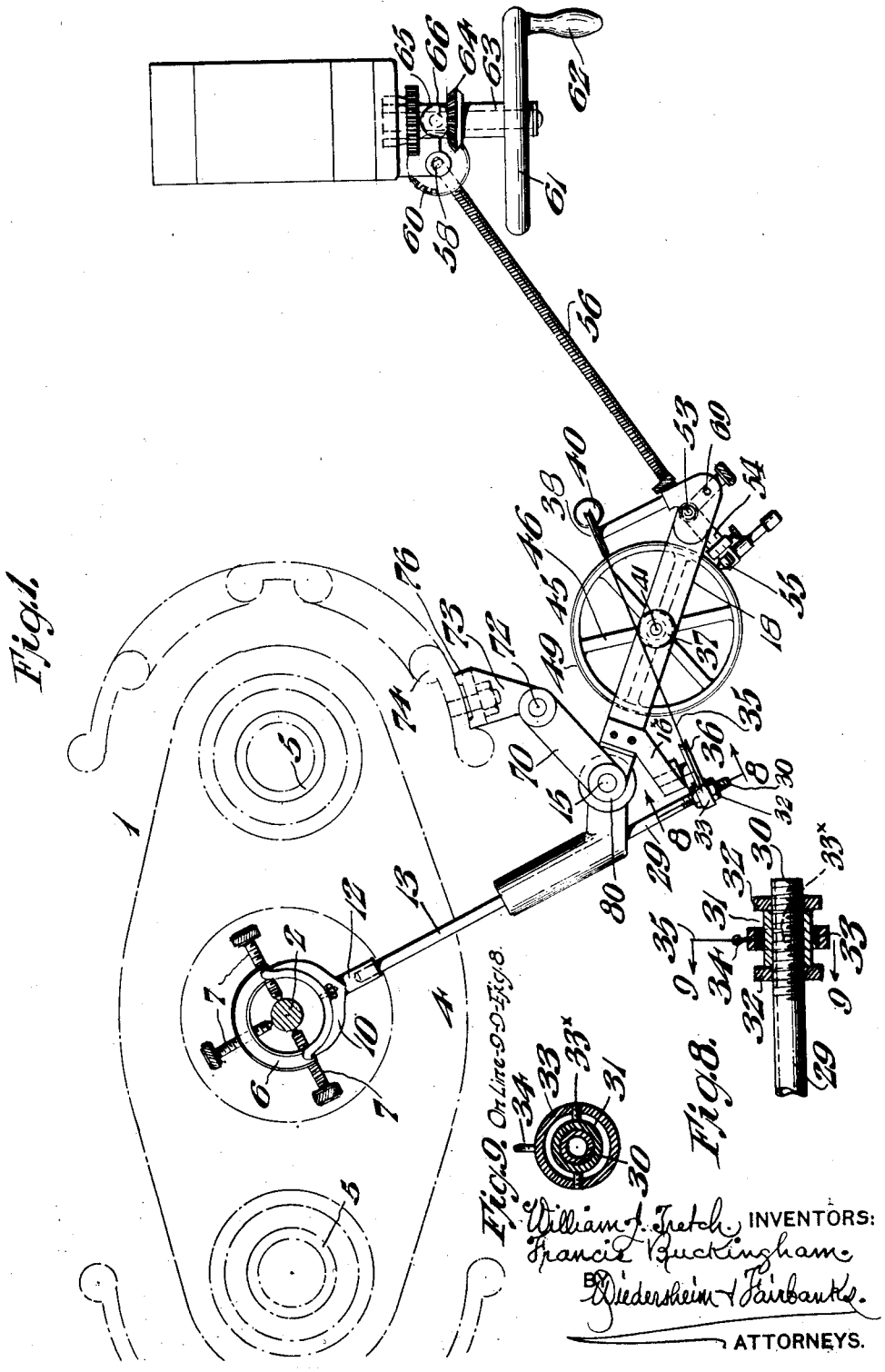

April 3, 1928.
W. J. TRETCH ET AL
1,664,999
RECORDING APPARATUS FOR TESTING MACHINES
Filed Dec. 15, 1922
4 Sheets-Sheet 2
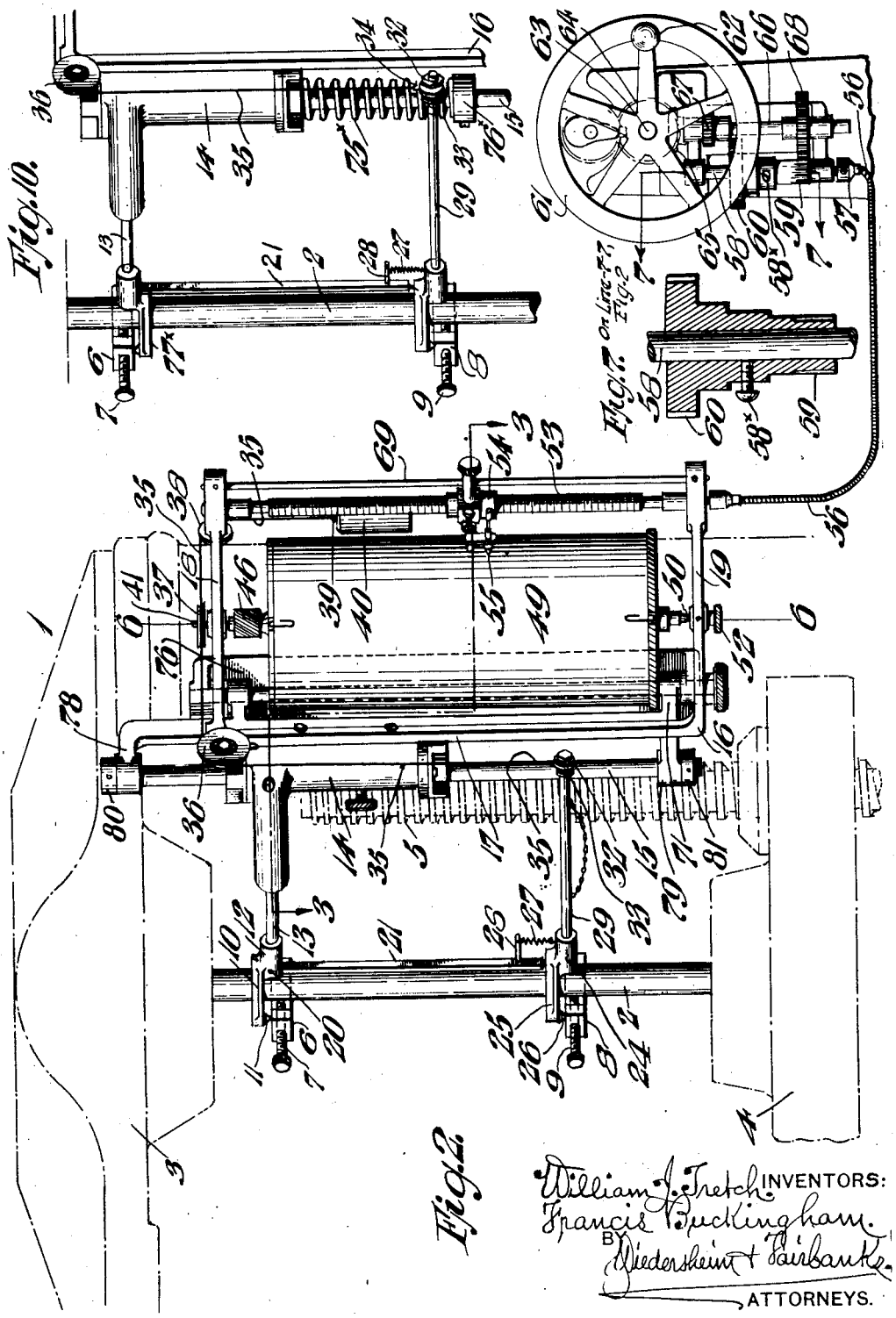

April 3, 1928. 1,664,999
W. J. TRETCH ET AL
RECORDING APPARATUS FOR TESTING MACHINES
Filed Dec. 15, 1922 4 Sheets-Sheet 3
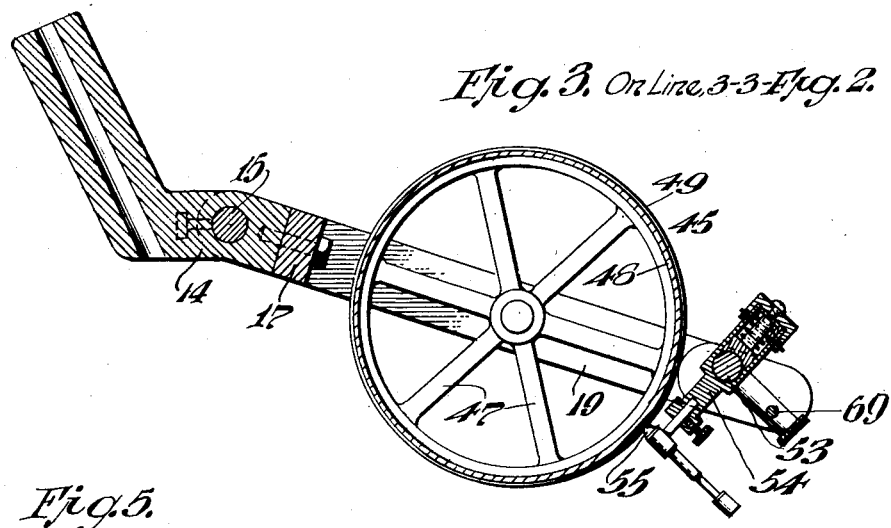
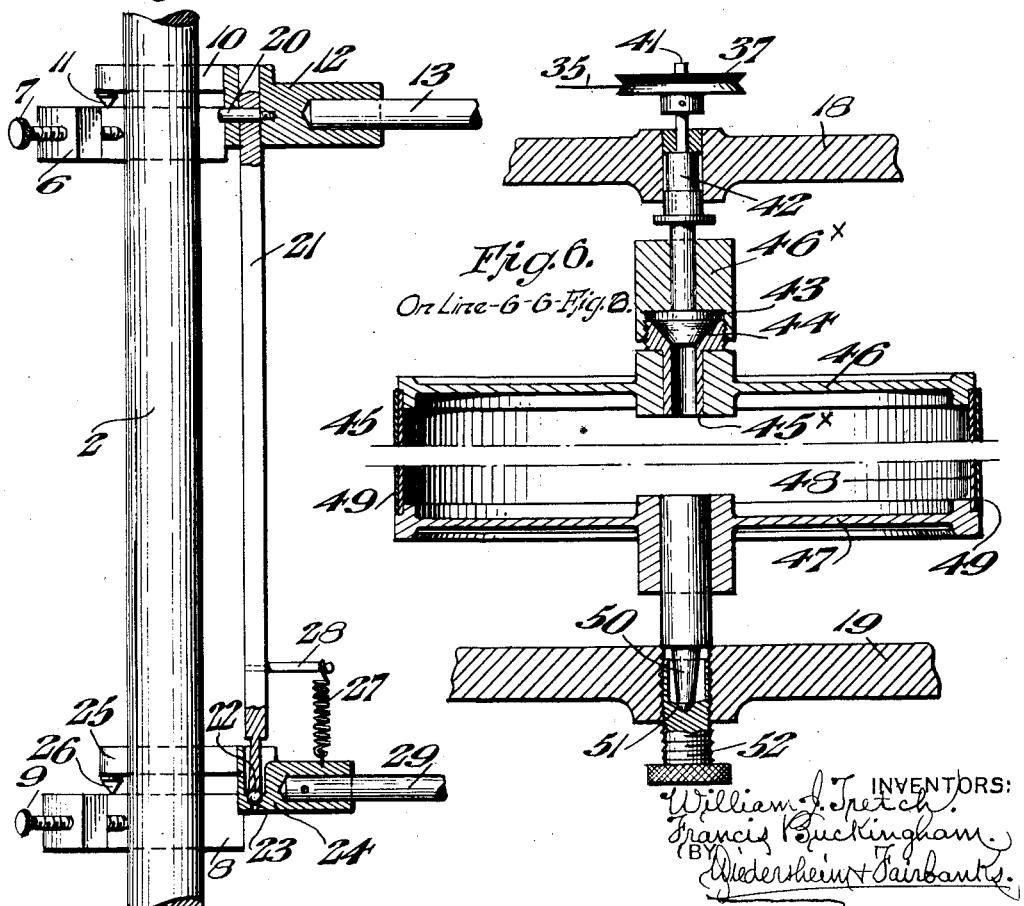

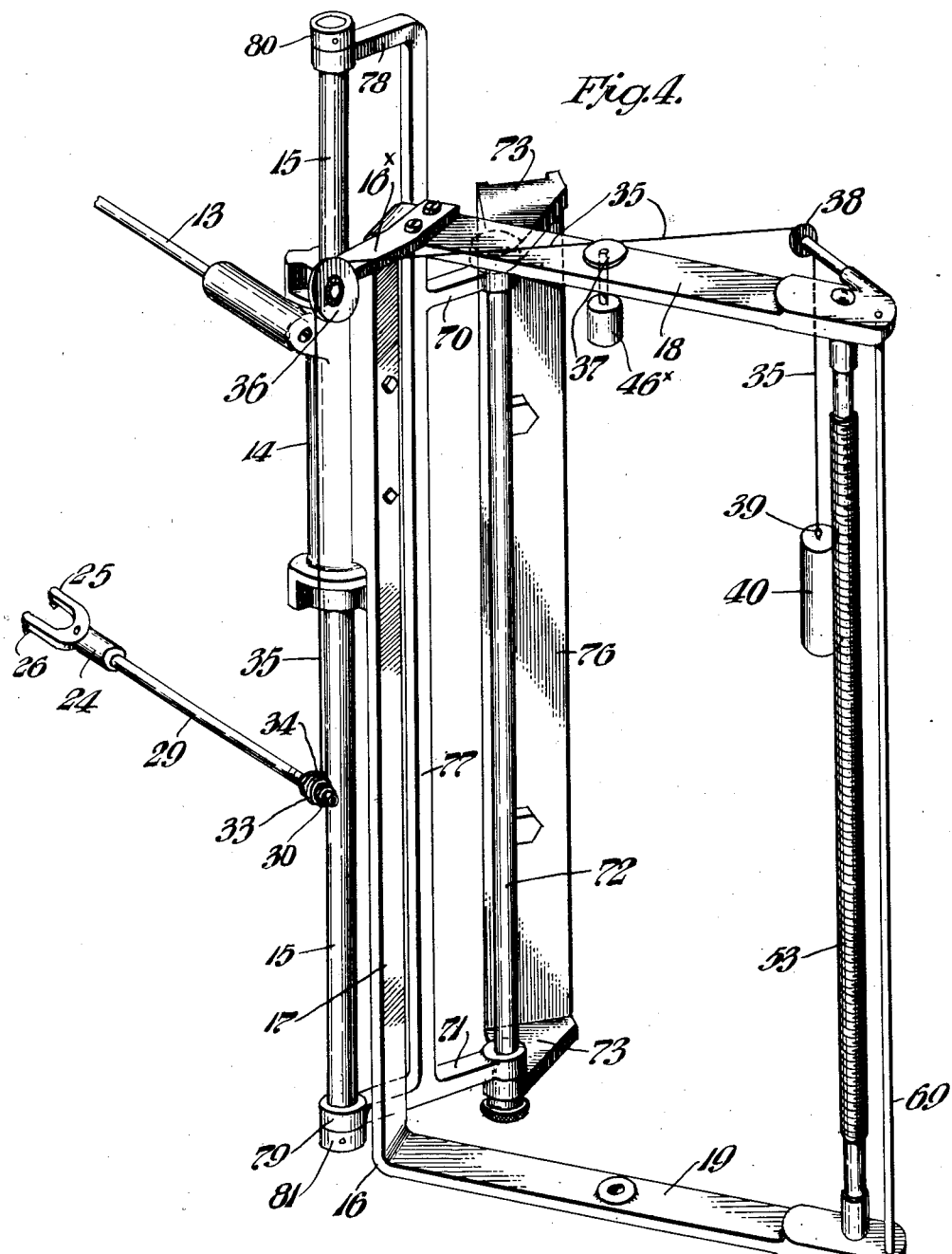

Patented Apr. 3, 1928.

1,664,999

UNITED STATES PATENT OFFICE.

WILLIAM J. TRETCH, OF PHILADELPHIA, PENNSYLVANIA, AND FRANCIS BUCKINGHAM, OF FRANKLINVILLE, NEW JERSEY, ASSIGNORS TO RIEHLE BROS. TESTING MACHINE CO., OF PHILADELPHIA, PENNSYLVANIA, A CORPORATION OF PENNSYLVANIA.

RECORDING APPARATUS FOR TESTING MACHINES.

Application filed December 15, 1922. Serial No. 607,112.

Our invention consists of a novel construction of a recording apparatus adapted to be attached to a specimen in a vertical screw or other testing machine, whereby novel means are provided for recording on a chart the deformation which is occurring in a specimen under test as the stress is applied.

It further consists of a novel construction of clamps and a novel manner of securing said clamps to the specimen to be tested in such a way that the recording apparatus is supported upon one of said clamps, so that the instrument responds to any motion or give of the specimen in the testing machine without in any way affecting the curve being made on the chart.

It further consists of a novel construction of a strut hinged in proximity to the upper supporting fingers, thereby allowing the latter to accommodate themselves to any uneven setting of the upper clamp.

It further consists of a novel hinged strut, a seat in the lower end thereof and a strut ball supported in a cavity carried by the lower fingers, in conjunction with means for allowing said lower fingers to adjust to any setting of the lower clamp, said ball also acting as a fulcrum for the lower fingers and the laterally projecting arm therefrom which form a lever, whereby a universal joint is produced which permits the necessary adjustment of said lower fingers.

It further consists of a novel manner of mounting, supporting and actuating the drum carrying the chart, means being provided whereby the drum can be quickly and conveniently detached from its support for a change of charts.

It further consists of a novel construction of a hinged bracket bolted to the frame of the machine, whereby one standard instrument can be installed on various sizes of testing machines, said hinged bracket affording a novel and convenient appliance for swinging the instrument in place upon the specimen.

It further consists of a novel adjustable spring support for the sleeve which carries the instrument, whereby the whole instrument is resiliently supported upon the spring, in cases where it is desirable to relieve the specimen of the weight of the instrument and to position the upper fingers under the upper clamp instead of on the top thereof.
It further consists of a novel combination of a pencil and its adjuncts, a moving chart, supporting fingers, moving fingers, and an application of power to cause the chart to move as one self-contained unit, so that the record made on the chart is not affected by any deformation that may occur in a testing machine.

It further consists of novel means for manually actuating the pencil coacting with the chart and a novel construction of a speed change device or interchangeable gearing preferably mounted on the beam stand, so that the speed of the pencil can be altered to make the curve of the most suitable size.
It further consists of a novel construction of a trunnion hook adjustably held upon the threaded stem carried by the lower fingers, which provides a convenient method of adjustment to insure correct deformation readings.

It further consists of a novel arrangement of lower fingers, a laterally projecting stem, a trunnion hook carried thereby, a connection therefrom passing over a sheave, and again passing over and once around an intermediate horizontal sheave mounted on a vertical spindle carrying the drum and chart, said connection passing thence over a vertically arranged sheave and being connected to a weight.

It further consists of a novel manner of mounting, supporting and connecting the intermediate horizontal sheave with its spindle, which is detachably connected to the drum carrying the chart, whereby the drum can be quickly and conveniently detached for a change of charts.

It further consists of a novel construction of a supporting frame for the drum, chart, indicating device and their adjuncts and means for supporting said frame upon the framework or housing of the testing machine.

It further consists of a novel construction of a frame having laterally projecting upper and lower arms, in the upper arm of which, is mounted the spindle for the horizontal intermediate sheave, which latter is detachably connected to the upper portion of the drum, the lower portion of said drum having an adjustable bearing mounted on the lower arm of said frame.

It further consists of other novel features of construction, all as will be hereinafter fully set forth.

For the purpose of illustrating our invention, we have shown in the accompanying drawings forms thereof which are at present preferred by us, since they will give in practice satisfactory and reliable results, although it is to be understood that the various instrumentalities of which our invention consists can be variously arranged and organized and that our invention is not limited to the precise arrangement and organization of these instrumentalities as herein shown and described.

Figure 1 represents a plan view of a recording apparatus embodying our invention attached to a vertical screw or other testing machine, a portion of the testing machine being shown in dotted lines.

Figure 2 represents a front elevation of Figure 1, a portion of the testing machine being shown dotted.

Figure 3 represents a section on line 3—3 of Figure 2, showing the relative position of the drum, its chart and the indicating device therefor.

Figure 4 represents on an enlarged scale a perspective view of the supporting frame and its adjuncts with the drum removed.

Figure 5 represents on an enlarged scale a side elevation of certain of the elements seen at the left of Figure 2, certain of the parts being shown in section to illustrate the hinging of the strut and the coaction of the lower end thereof with the ball carried in the lower fingers.

Figure 6 represents on an enlarged scale, a section on line 6—6 of Figure 2, showing the detachable connections for enabling the drum to be quickly and conveniently detached for a change of the chart.

Figure 7 represents on an enlarged scale, a sectional view partly in elevation on line 7—7 Figure 2.

Figure 8 represents a side elevation partly in section of the right hand end of the lower laterally projecting stem seen in Figures 2 and 4, showing the manner of adjustably mounting the trunnion hook on said stem.

Figure 9 represents a section on line 9—9 Figure 8.

Figure 10 represents a side elevation of a modification of the construction, seen in Figure 2.

Similar numerals of reference indicate corresponding parts in the figures.

Referring to the drawings:—

In carrying out our invention we have shown the same in connection with a vertical screw testing machine seen dotted in Figures 1 and 2, the ends of the speciment 2 to be tested being secured to crossheads as 3 and 4 one of which may be actuated or operated by screws as 5, to stretch the specimen to the desired extent, it being however understood that my invention is capable of adaptation to other types of testing machines than that shown.

6 designates an upper clamp, which is secured to the upper portion of the specimen 2 by the set screws 7, and 8 designates the lower clamp secured to the specimen by the set screws 9, our novel instrument recording the deformation occurring between these points of attachment.

10 designates upper fingers which rest at the points 11 upon the upper clamp 6, said fingers being connected to or projecting from the head 12, from which projects laterally the rod 13, which is connected to the sleeve 14, which slides on the rod 15, held by the machine frame. The frame 16 is secured to the sleeve 14 in any suitable manner and comprises the upright member 17 from which projects the upper and lower arms 18 and 19, it being apparent that the whole mechanism including said frame and its adjuncts is supported on the specimen 2.

At the point 20, see Figures 2 and 5, is hinged the upper end of the strut 21, having on its lower end a concavity or ball seat 22 (see Figure 5) which rests on a steel ball 23, seated in a chamber in a head 24, which serves as a universal joint and carries the lower fingers 25, which are supported at the points 26 upon the lower clamp 8. The spring 27 common to the head 24 and the pin 28, projecting from the lower portion of the strut 21, keeps the ball 23 in proper contact with its seat as will be evident from the lower portion of Figure 5.

29 designates a rod or long stem projecting laterally from the lower head 24, and functioning as a lever fulcrumed on the ball 23. The outer end of the stem 29 is threaded at 30, and carries the loose sleeve or collar 31, having the nuts 32 between which is the trunnion ring 33 pivotally mounted at 33ˣ (see Figures 8 and 9) and having the hook 34 secured thereto, to which is fastened the lower end of the thread 35, which runs over the sheave 36 supported from the arm 16ˣ, once around the intermediate horizontal sheave 37, and thence around the sheave 38, its end 39 being secured to the weight 40 as best seen in Figures 2 and 4. The intermediate horizontal sheave 37 is mounted on the upright spindle 41, which is connected to the shaft 42, which has its bearings in the upper arm 18, (see Figure 6) the lower end of said shaft having the conical head 43, which is clamped to the head containing the conical seat 44 of the bushing 45ˣ, by the nut 46ˣ, which is in threaded engagement with said head. The drum 45 is composed of the upper and lower spiders 46 and 47 carrying the cylinder 48, against which is secured the chart 49, and from the hub of the lower spider 47 projects the lower bearing 50, which is stepped into the seat 51 of the adjustable member 52, mounted in the lower arm 19, it being apparent that the sheave 37 and the parts 41, 42, 46, 44, 45 and 50 revolve in unison as a unit, the thread 35 being kept tight by the weight 40, which latter also keeps the fingers 25 hard against the lower clamp 8, and in addition causes the drum 45 and its chart to revolve in proportion to the change in distance between the clamps 6 and 8, when the specimen 2 is tested. 53 designates a screw rotatably mounted in the arms 18 and 19 and extending parallel to the drum 45, and carrying the pencil holder 54 and pencil 55, which may be of any suitable construction, and need not be described in detail. The lower end of the screw 53 is connected with one end of the flexible shaft 56, whose other end is connected at 57 with the upright spindle 58, whose lower portion has the pinion 59 thereon above which is the gear 60, said gear and pinion being adjustable as a unit on the spindle 58 and held in position by the set screw 58ˣ, (see Figure 7). 61 designates a hand wheel having the handle 62, which is mounted on the shaft 63, which carries the bevel gear 64 in mesh with the bevel pinion 65 which is mounted on upright shaft 66, which is parallel to the shaft 58 and carries the pinion 67, which is adapted to mesh with the gear 60 when desired and the gear 68 which is adapted to mesh with the pinion 59, it being of course understood that when the gears 68 and 59 are in mesh (as in Figure 2) the gears 67 and 60 are out of mesh. It will be apparent from Figure 2 that the rotation of the hand wheel 61 effects, by the intermediate connections, the rotation of the shaft 66 and by the intermeshing of the gears 68 and 59 the flexible shaft 56 and screw 53 are rotated, thereby moving the pencil 55 longitudinally of the chart 49 as the latter rotates.

The speed change device seen at the right hand portion of Figures 1 and 2 is preferably located on the beam stand of the testing machine and when the gears are in mesh as seen in Figure 2, it will be apparent that a relatively rapid rotation will be imparted to the flexible shaft 56 and the screw 53. Upon making the proper adjustments to throw the gears 60 and 67 into mesh and throw the gears 59 and 68 out of mesh, it will be evident that a relatively slower rotation will be imparted to said flexible shaft and screw. The frame 16 carrying the drum and its adjuncts can be constructed and supported in any suitable manner, but we preferably tie the outer ends of the arms 18 and 19 together by the upright rod 69 (see Figures 2 and 4) and we support the frame 16 from the sleeve 14 and support the upright 77 by means of the upper and lower arms 70 and 71, through which passes the upright rod 72 which is supported from the arms 73 of the bracket 76 bolted to the frame 74 of the testing machine. The arms 70 and 71 are connected to the upright 77, (see Figure 4) and the latter has the deflected ends 78 and 79, through which pass the ends of the rod 15, which carry the upper and lower collars 80 and 81. By this construction a standard bracket can be made to fit various sizes of machines and this hinged bracket connection provides a new and convenient method of swinging the instrument in place on the specimen. In the construction seen in Figure 10 we have shown an adjustable spring support for the sleeve 14, comprising the spring 75ˣ, supported on the adjustable collar 76ˣ, whereby the whole instrument is supported upon said collar and spring, in cases where it is desirable to relieve the specimen of the weight of the instrument, and to operate the upper fingers 77ˣ under the upper clamp 6, instead of on the top thereof as seen in Figures 2 and 5.

The operation is as follows:—

The parts having been assembled as seen in Figures 2 and 5, it will be apparent that the weight of the instrument will be supported by the contact of the upper fingers 10 upon the upper clamp 6, the whole mechanism being thus supported upon the specimen 2. The pull exerted by the weight 40 will be imparted to the outer end of the long stem 29, the ball 22 seen in Figure 5 serving as a fulcrum point, and making a true universal joint, that allows the lower fingers 25 to adjust to any setting of the lower clamp 8, while the strut 21 allows the upper fingers to accommodate themselves to any uneven setting of the upper clamp 6.

It will be apparent that the instrument records the deformation occurring between the points of attachment of the clamps 6 and 8 and that as the testing machine is operated, the stretch of the specimen 2 will be visually portrayed by the pencil 55 upon the chart 49 during the revolution thereof since any change in the position of the stem 29 will, through the medium of the thread 35 cause the rotation of the sheave 36 and also of the intermediate horizontal sheave 37, which will effect the rotation of the drum 45 and its chart 49. Simultaneously with the stretching of the specimen 2, the operator rotates the hand wheel 61 and by reason of the gears 64 and 65, the shaft 66 will be rotated together with the gear 68 and the pinion 59. The pinion 59 rotates in unison with the shaft 58, as will be understood from Figure 7, and the rotation of said shaft through the medium of the flexible shaft 56 will effect the rotation of the screw 53, which will cause the pencil 55 to move vertically and portray a curve on the chart 49.

It will be apparent that the motion of the pencil in proportion to the stress combined with the revolution of the drum, in proportion to the strain, produces a very accurate stress-strain diagram on the chart 49 fastened around the drum 45 from which the modulus of elasticity can be readily calculated. It will be apparent that by reason of the trunnion 33$^x$, see Figures 8 and 9, and manner of mounting and assembling the trunnion hook 34, and the adjustable nut 32, that the proper or desired multiplication can be obtained with the stem 29. By reason of the employment of the strut 21 and its adjuncts seen in Figure 5 a very accurate operation of the co-acting parts is ensured and by reason of the connections seen in Figure 6, wherein the nut 46$^x$ is employed, it will be apparent that upon loosening said nut, the drum 45 can be readily and conveniently detached for the purpose of changing charts.

By the provision of the speed change device seen in Figure 7 and at the right of Figure 2, it will be apparent that the speed of rotation of the shaft 58, and consequently the speed of rotation of the flexible shaft 56 and the screw 53 can be readily altered to suit requirements, so that the speed of the pencil 55 can be altered to portray the curve of most suitable size.

By the construction of hinged bracket applied to the frame of the machine, as will be understood from Figure 4, a standard instrument can be made to fit various sizes of testing machines and this hinged bracket construction obviously provides a new and convenient method of swinging the instrument in place upon the specimen 2. In case it is desired to relieve the specimen 2 of the weight of the instrument the adjustable spring support seen in Figure 10 may be employed, in which case the upper fingers 77 are positioned under clamp 6 instead of on the top thereof as seen in Figure 2.

Our invention can be quickly installed in position and will accurately record on the chart, the deformation changes occurring in a specimen under test, as the stress is applied.

Having thus described our invention, what we claim as new and desire to secure by Letters Patent, is:—

1. In a device of the character stated for testing the amount of elongation of the specimen being tested, clamps adapted to be attached to the specimen to be tested, upper and lower fingers adapted to contact with said clamps, an upper rod connected to said upper fingers, a frame carried by said upper rod, a recording instrument supported in said frame, a stem projecting from said lower fingers, a flexible connection from said stem to a movable portion of said instrument, for rotating the latter when stress is applied to the specimen to be tested and a drum actuated by deflection of said specimen.

2. In a device of the character stated, upper and lower clamps, means for securing said clamps to the specimen to be tested, upper and lower fingers contacting with said clamps, an upright strut hinged at its upper end upon said upper fingers, a ball contacting with a seat, in the lower end of said strut, said ball being carried by said lower fingers, tension devices common to said lower fingers and strut, for holding the latter in contact with said ball, and means for recording any movement of said lower stem occurring during the deformation of the specimen to be tested as to amount of elongation.

WILLIAM J. TRETCH.
FRANCIS BUCKINGHAM.